(12) United States Patent  (10) Patent No.: US 7,490,256 B2
Marshall et al.  (45) Date of Patent: Feb. 10, 2009

(54) IDENTIFYING A TARGET PROCESSOR IDLE STATE

(75) Inventors: Allen Marshall, Woodinville, WA (US); Andrew J Ritz, Sammamish, WA (US); Todd L Carpenter, Monroe, WA (US)

(73) Assignee: Microsoft Corporation, Redmond, WA (US)

( * ) Notice: Subject to any disclaimer, the term of this patent is extended or adjusted under 35 U.S.C. 154(b) by 364 days.

(21) Appl. No.: 11/397,782

(22) Filed: Apr. 4, 2006

(65) Prior Publication Data

US 2007/0234088 A1  Oct. 4, 2007

(51) Int. Cl.
*G06F 1/32* (2006.01)
(52) U.S. Cl. .................. 713/321; 713/323
(58) Field of Classification Search ............. 713/321, 713/323
See application file for complete search history.

(56) References Cited

U.S. PATENT DOCUMENTS

| 6,732,283 B2* | 5/2004 | Watts et al. ............. 713/322 |
| 7,318,164 B2* | 1/2008 | Rawson, III ............ 713/320 |
| 2005/0138443 A1* | 6/2005 | Cooper .................. 713/300 |

\* cited by examiner

*Primary Examiner*—Thuan N Du
(74) *Attorney, Agent, or Firm*—Wolf, Greenfield & Sacks, P.C.

(57) ABSTRACT

Embodiments of the present invention are directed at identifying an idle state for a processor that minimizes power consumption. In accordance with one embodiment, a method for identifying a target idle state that does not require a linear progression into any intermediate states is provided. More specifically the method includes collecting data from a plurality of data sources that describes activities occurring on the computer and/or attributes of the hardware platform. Then, using the collected data, a target idle state for the processor is calculated. Finally, if the current idle state of the processor is different than the target idle state, the method causes the idle state of the processor to be changed to the target idle state.

20 Claims, 3 Drawing Sheets

302 — GENERAL DATA

306 — TIME OF PREVIOUS CALCULATION   VARIABLE A
308 — POLICIES   VARIABLE B
310 — METRIC OF PAST PROCESSOR IDLENESS   VARIABLE C
312 — METRIC OF FUTURE PROCESSOR IDLENESS   VARIABLE D
314 — METRIC OF NON-PROCESSOR ACTIVITY   VARIABLE E

304 — PROCESSOR SPECIFIC DATA
316 — LATENCY   VARIABLE F
318 — POWER SAVINGS   VARIABLE G

*Fig.3.*

IDENTIFYING A TARGET PROCESSOR IDLE STATE

BACKGROUND

Market requirements, environmental needs, business costs, and limited battery life dictate that computing devices use as little energy as possible while still providing robust computing services. The energy consumed by a computing device can be more efficiently managed by providing enough computational power for each service as needed instead of providing maximum computational power at all times. Computing devices such as laptop, desktop, and mainframe computers, personal digital assistants (PDAs), cellular telephones, etc., provide services by causing program instructions to be executed by electronic circuitry. The electronic circuitry that executes computer program instructions in a computing device is often contained in a single integrated circuit referred to as a "core." A core is contained in a single physical package often referred to as a "microprocessor" or simply a "processor." Moreover, multiple interacting cores may be contained in a single processor.

Most computing devices execute a computer program commonly referred to as an operating system that guides the operation of the computing device and provides services to other programs. More specifically, an operating system controls the allocation and usage of hardware resources such as memory, computing resources, mass memory storage, peripheral devices, etc. The computer instructions for initializing and operating the computing device are typically contained in a component of the operating system often referred to as the "kernel." Shortly after a computing device is started, the kernel begins executing. Since a kernel has direct control of the hardware and access to data that describes the state of a computing device, a kernel may be used to regulate computing power and otherwise control energy consumption.

In some existing systems, software components in a kernel reduce the consumption of power used by a processor through the use of processor idle sleep states (hereinafter sometimes referred to as "C-states"). For example, some computers adhere to a specification commonly known as Advanced Configuration and Power Interface ("ACPI"). In this example, when a computer is put into in any of the available C-states, instructions are not executed. However, a processor will regularly "wake up" or exit the idle sleep state and transition back to the working state automatically when any user or platform activity occurs so that instructions may be executed. Then, the processor will be put back to "sleep" to save power. Since the processor is able to enter and exit idle sleep states very quickly, the user experience of interacting with programs is not affected when the processor is put into an idle sleep state.

When a predetermined threshold amount of idleness is identified, a processor may transition from the working state ("C0") in which the processor consumes the most amount of power into an initial idle C-state ("C1"). Traditionally, when a processor is in an idle C-state (e.g., "C1") and an additional predetermined threshold amount of idleness is identified over a given time period, the processor transitions from the current C-state (e.g., "C1") into the next higher or deeper C-state (e.g., "C2"). On one hand, each successively higher C-State provides greater levels of power savings. On the other hand, a higher C-state is associated with a greater latency overhead required to exit the idle sleep state. Stated differently, using a higher C-state than is appropriate based on the idleness of the processor could adversely affect system responsiveness and the user experience. As a result, existing systems use a linear promotion and demotion scheme for selecting a C-state in which a predetermined amount of time is accrued in a C-state before a promotion or demotion to the next appropriate C-state occurs. However, a linear promotion/demotion scheme for transitioning between C-states does not take advantage of recent advances in hardware technology. Instead, additional power savings may be achieved by using a non-linear scheme for setting an appropriate processor state.

SUMMARY

Generally described, embodiments of the present invention are directed at identifying an idle sleep state for a processor that minimizes power consumption. In accordance with one embodiment, a method for identifying a target idle state that does not require a linear progression into an intermediate idle state is provided. More specifically, in this embodiment, the method includes collecting data from a plurality of data sources that describe activities occurring on the computer and/or attributes of the hardware platform. Then, using the collected data, a target idle state for the processor is identified. Finally, if the current idle state of the processor is different than the target idle state, the method causes the idle state of the processor to change to the target idle state without causing the processor to enter any intermediate idle states.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The present invention may be described in the general context of computer-executable instructions, such as program modules, being executed by a computer. Generally described, program modules include routines, programs, applications, widgets, objects, components, data structures, and the like that perform particular tasks or implement particular abstract data types. Moreover, the present invention may also be practiced in distributed computing environments where tasks are performed by remote processing devices that are linked through a communications network. In a distributed computing environment, program modules may be located on local and/or remote computer storage media.

While the present invention will primarily be described in the context of using a specific software interface known as Advanced Configuration and Power Interface ("ACPI") to collect data and minimize the amount of power consumed by a processor, those skilled in the relevant art and others will recognize that the present invention is also applicable in other contexts. In any event, the following description first provides a general overview of a computer system in which aspects of the present invention may be implemented. Then a method for performing aspects of the invention is described. The illustrative examples described herein are not intended to be exhaustive or to limit the invention to the precise forms disclosed. Similarly, any steps described herein may be interchangeable with other steps or combinations of steps in order to achieve the same result.

Figure 1:
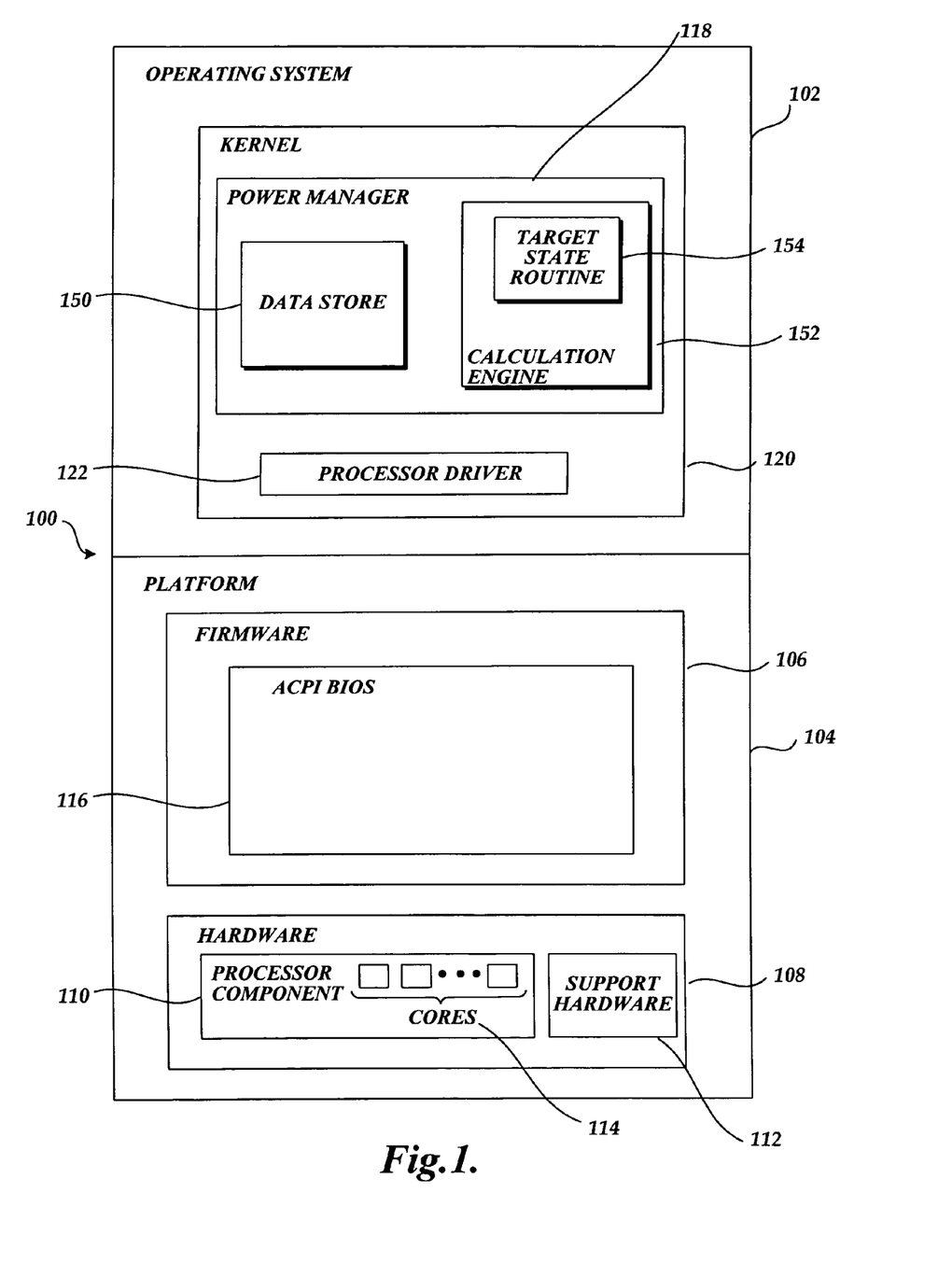
FIG. 1 is a block diagram of an exemplary computer architecture comprising components that are suitable to implement aspects of the present invention.

Now with reference to FIG. 1, an exemplary computer 100 with components that are capable of implementing aspects of the present invention will be described. Those skilled in the art and others will recognize that the computer 100 may be any one of a variety of devices including, but not limited to, personal computing devices, server-based computing devices, mini- and mainframe computers, laptops, personal digital assistants ("PDAs"), or other electronic devices having some type of memory. For ease of illustration and because it is not important for an understanding of the present invention, FIG. 1 does not show the typical components of many computers, such as a memory, keyboard, a mouse, a printer, or other I/O devices, a display, etc. However, as illustrated in FIG. 1, the computer 100 includes two primary components namely, an operating system 102 and a platform 104. The operating system 102 is a set of interacting software components for controlling the allocation and usage of hardware resources that are supported by, and executed on, the platform 104. As further illustrated in FIG. 1, the platform 104 comprises firmware 106 and hardware 108.

In the computer 100 illustrated in FIG. 1, the hardware 108 comprises a processor component 110 and support hardware 112. The processor component 110 may comprise one or more processors; each of which may include one or more cores 114. Support hardware includes, but is not limited to, controllers, storage devices, digital signal processors (DSPs), media access adapters, digital to analog converters (DACs), analog to digital converters (ADCs), and Input/Output (I/O) controllers, etc.

In this embodiment, the firmware 106 comprises software components stored in non-volatile memory such as, but not limited to, read-only memory (ROM), programmable read-only memory (PROM), electrically erasable programmable read-only memory (EEPROM), or flash memory. Moreover, the firmware 106 includes a Basic Input/Output System (BIOS) 116 with computer instructions that enable the computer 100 to perform functions for initializing the computer's 100 hardware when power is first applied after which the BIOS 116 boots the operating system 102. Typically, when a computer is powered up, the computer's BIOS conducts a hardware check, called a Power-On Self Test (POST), to determine whether the support hardware is present and working correctly. Then instructions in the BIOS direct control to a boot loader that loads the operating system into a computer's volatile memory, e.g., a bank of random access memory (RAM) memory devices. The BIOS is typically located in non-volatile memory to ensure that the BIOS is always available and will not be damaged by failures affecting volatile memory or mass data storage. A BIOS also provides low-level input/output control. For example, in a personal computer, the BIOS contains the computer instructions required to control the keyboard, display screen, disk drives, serial communications, and a plurality of miscellaneous functions. A typical implementation of a BIOS is a PC-AT BIOS, i.e., the BIOS used in a variety of computers that run a Windows® operating system. Other implementations of a BIOS include, but are not limited to, the Open Firmware (OFW) and Open Boot PROM (OBP).

The operating system 102 of the computer 100 often includes a power manager 118 that typically resides in an operating system kernel 120, for controlling the levels of certain processor characteristics, such as but not limited to, voltage and frequency. Generally described, one aspect the power manager 118 provides logic for the power management functions of the computer 100. Moreover, the power manager may communicate with a processor driver 122 that is used to abstract the differences in specific controls between various processors, and to execute state transitions that cause changes in a processor's voltage and/or frequency levels. Also residing in the operating system kernel 120, the processor driver 122 directly interfaces with hardware on the computer 100 to implement logic contained in the power manager 118. For example, when the computer 100 boots, the processor driver 122 reads the data included in a BIOS 116 to discover the power management capabilities of a processor and passes this information to the power manager 118. In accordance with one embodiment, data passed to the power manager 118 includes a set of ACPI compliant data obtained from the BIOS 116 that describes the power management capabilities of a processor component 110. Those skilled in the art and others will recognize that even though the exemplary embodiments described herein uses ACPI compliant data stored in the BIOS 116 to identify the attributes of computer hardware, in other embodiments, the data may adhere to a different standard or not be based on a standard without departing from the scope of the claimed subject matter.

As illustrated in FIG. 1, the power manager 118 includes a data store 150 and a calculation engine 152 that uses a target state routine 154 to identify a state for the processor component 110. In actual embodiments of the present invention, the power manager 118 includes other components not depicted in FIG. 1. However, since these components are not important for an understanding of the present invention they are not described here.

The data store 150 illustrated in FIG. 1 provides the calculation engine 152 and the target state routine 154 with data that is used to regulate the power consumption of the computer 100. For example, as described previously, a set of ACPI compliant data stored in the BIOS may be passed to the operating system 102 when the computer "boots." Among other things, the data passed to the operating system 102 includes attributes of the processor component 110. In accordance with one embodiment, this data is stored in the data store 150 and may be accessed by various components of the power manager 118 including the target state routine 154. However, since the types of data that may be stored in the data store 150 will be described below with reference to FIG. 3, further description of this aspect of the invention will not be provided here.

As further illustrated in FIG. 1, the power manager 118 includes the calculation engine 152. Generally described, the calculation engine 152 is responsible for identifying a idle state for the processor component 110 that both (1) allows necessary tasks to be performed without negatively impacting the responsiveness of the computer 100; and (2) conserves the power expended when the processor component 110 experiences idleness. As mentioned previously, in some existing systems the consumption of power is minimized through the use of various idle states (e.g., "C-states"). These existing systems use a linear promotion and demotion scheme in which a predetermined amount of time is accrued in a particular state before a promotion or demotion to the next appropriate state may occur. However, additional power savings may be achieved in modern computers if the calculation engine 152 uses a non-linear scheme to identify an appropriate state. Preferably, this non-linear scheme will use prospective data that quantifies tasks scheduled to be performed on a computer when identifying the appropriate state.

As further illustrated in FIG. 1, the power manager 118 includes a target state routine 154. Since different aspects of the target state routine 154 are described in further below with reference to FIG. 2, a detailed description of the routine 154 will not be provided here. However, generally described, the routine 154 identifies a state for the processor component 110 that minimizes power consumption. Moreover, the logic implemented by the target state routine 154 does not require the processor component 110 to proceed through a linear progression of states when the processor component 110 experiences idleness. Instead, the target state routine 154 obtains prospective data that describes tasks scheduled to be performed to identify the most appropriate state.

FIG. 1 is a simplified example of one exemplary computer 100 with components that are capable of performing the functions of the present invention. However, actual embodiments of a computer that implements the present invention will have additional components not illustrated in FIG. 1 or described in the accompanying text. Also, FIG. 1 shows one component architecture of a computer 100 that may be used to implement aspects of the present invention. In this regard, for the sake of convenience, FIG. 1 illustrates a computer 100 that has a specific component configuration. However, those skilled in the art and others will recognize that the present invention may be practiced with many other computer system configurations without departing from the scope of the claimed subject matter.

Now with reference to FIG. 2, an exemplary embodiment of a target state routine 154, briefly mentioned above with reference to FIG. 1 will be described in further detail. As a preliminary matter and in accordance with one embodiment, the target state routine 154 is executed after a set of ACPI compliant data is retrieved from the BIOS 116 and stored in a location that is accessible to the target state routine 154 (e.g., the data store 150). Moreover, using existing systems, other types of data that describes the activities occurring on a computer may be collected and stored in the data store 150 prior to the target state routine 154 being executed. In general terms, the routine 154 performs an analysis of a data set to identify an optimized or target idle state for a processor and then causes the processor to be changed to that idle state. As a result, the power expended by a computer is significantly reduced. Now with continuing reference to FIG. 1, an exemplary embodiment of a target state routine 154 will be described in further detail.

Figure 2:
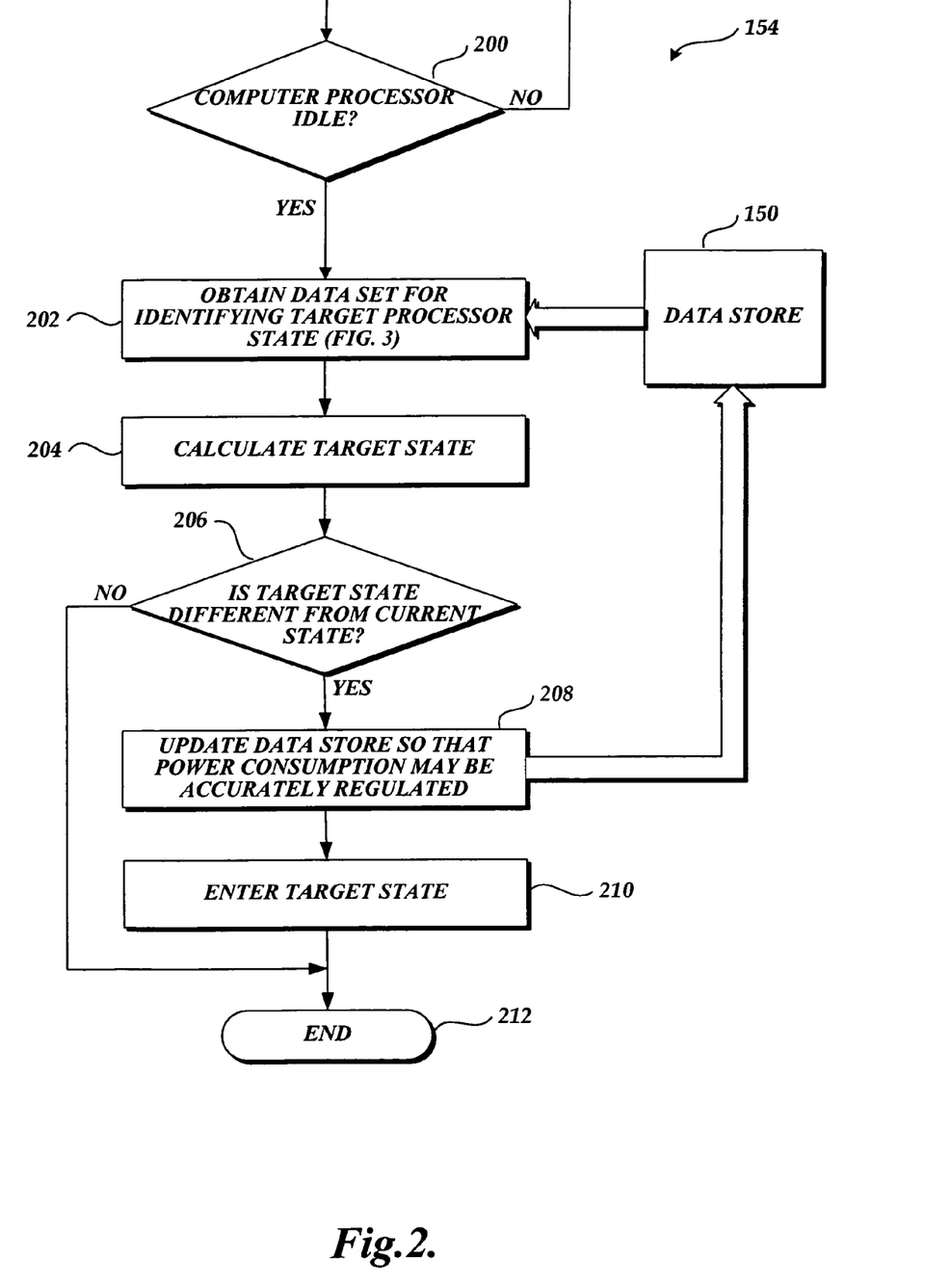
FIG. 2 is a functional flow diagram of a target state routine suitable to illustrate an exemplary method for dynamically identifying an idle sleep state for a processor that minimizes power consumption.

As illustrated in FIG. 2, the target state routine 154 begins at decision block 200 when a determination is made that a processor on a computer is idle. Those skilled in the art and others will recognize that in modern computing systems the basic unit of work for executing program code is a thread. At a given time, a thread may be assigned to one of a number of different states by an operating system including, but not limited to the states of running, ready, blocked, sleeping, etc. A thread in the "ready" state has associated program code that may be executed as soon as a processor becomes available. Moreover, a data structure (sometimes referred to as a "ready queue") manages threads on behalf of an operating system by allocating time slices to the different "ready" threads so that each thread may cause program code to be executed by a processor. In accordance with one embodiment of the present invention, the determination that the processor is idle made at block 200 when a regularly scheduled check is performed on the contents of the ready queue and the queue is "empty." Stated differently, the processor is considered to be idle when a thread does not exist that is in the "ready" state. However, those skilled in the art and others will recognize that the determination made at block 200 may use other techniques than those described herein without departing from the scope of the claimed subject matter.

At block 202, the target state routine 154 obtains a data set that is used to identify an optimized or target state for a processor. In the embodiment depicted in FIG. 2, the data obtained by the target state routine 154, at block 202, is maintained in the data store 150 which provides a centralized location where data that is used to regulate the power consumption of a computer is collected from a plurality of data sources. As described in further detail below, an analysis may be performed on the data obtained at block 202 to identify a target state for a processor.

Figure 3:
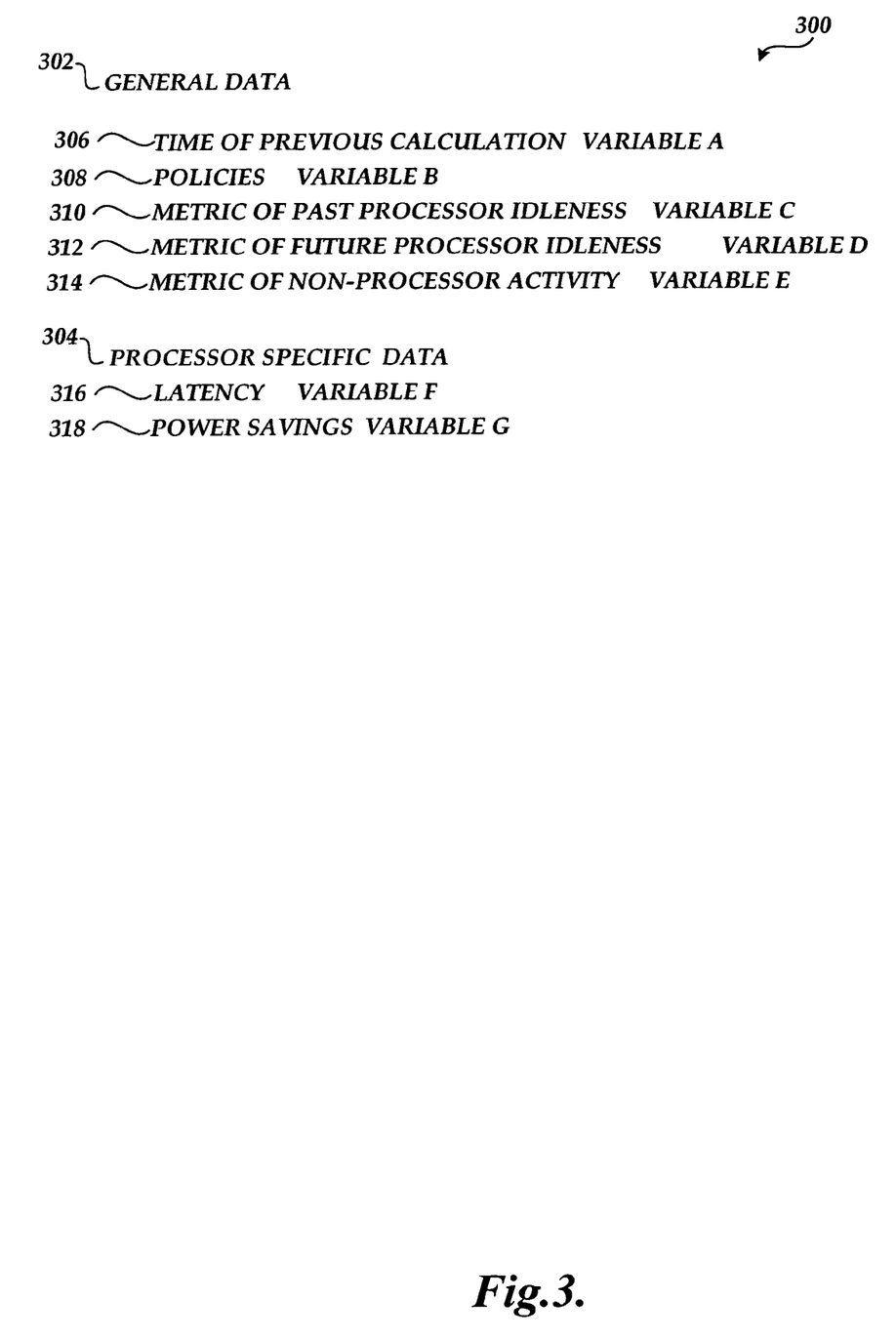
FIG. 3 is a pictorial depiction that displays an exemplary data set accessible to the target state routine depicted in FIG. 2 that may be used to calculate a target state for a processor.

Now with reference to FIG. 3, for illustrative purposes and by way of example only, an exemplary data set 300 that may be obtained from the data store 150 by the target state routine 154, at block 202, will be described. As illustrated in FIG. 3, the data set 300 illustrated in FIG. 3 is divided into two categories, namely the "GENERAL DATA" category 302 and the "PROCESSOR SPECIFIC DATA" category 304. In this embodiment, the "GENERAL DATA" category 302 includes five rows 306, 308, 310, 312, and 314 each of which contains a variable that describes activities being performed on a computer. Moreover, in this embodiment, the "PROCESSOR SPECIFIC DATA" category 304 contains rows 316 and 318 with variables that describe the specific attributes of the processor included with a computer such as the computer 100 illustrated in FIG. 1.

As mentioned above, the "GENERAL DATA" category 302 includes five rows entitled "TIME OF PREVIOUS CALCULATION" 306, "POLICIES" 308, "METRIC OF PAST PROCESSOR IDLENESS" 310, "METRIC OF FUTURE PROCESSOR IDLENESS" 312, and "METRIC OF NON-PROCESSOR ACTIVITY" 314. Simply stated, the row 306 contains a variable that measures the time since the most recent calculation to identify a target state for a processor. As described in further detail below, the variable contained in row 306 may be used to identify a target state for a processor.

As further depicted in FIG. 3, the "POLICIES" row 308 contains a pointer variable that references a set of configurable policies. In accordance with one aspect of the present invention, an operating system installed on a computer is configured to adhere to a set of power management policies that define the conditions in which a processor may change states. For example, an operating system provider may implement conservative power management policies for a given set of hardware. However, a computer manufacturer that has a better understanding of the hardware capabilities of a computer may configure an operating system to adhere to a more aggressive set of policies to maximize the conservation of power. In any event, a set of policies that may be set by an operating system provider or other entity may be used to identify a target state for a processor. In accordance with one embodiment, data that defines these policies are referenced by the pointer variable that is displayed in a row 308.

As further illustrated in FIG. 3, the row entitled "METRIC OF PAST PROCESSOR IDLENESS" 310 is included in the data set 300 that is obtained by the target state routine 154 at block 202. As mentioned previously in the Background Section, some existing systems cause a processor to transition from a current state into a higher or deeper state when a predetermined threshold amount of idleness is identified. With these existing systems a metric is calculated that quantifies the idleness of a processor over a specified period of time. As described in further detail below, this metric may be one factor that is used to identify a target state for a processor by the present invention. However, it should be well understood that the metric of past processor idleness is merely one factor that may be used.

As further illustrated in FIG. 3, the row entitled "METRIC OF FUTURE PROCESSOR IDLENESS" 312 is included in the data set 300 that is obtained by the target state routine 154 at block 202. Increasingly, modern operating systems allow programs to schedule processing at a future point in time. For example, some operating systems allow programs to issue Deferred Procedure Calls ("DPCs"). Those skilled in the art and others will recognize that a DPC is one mechanism that allows a program to postpone work for later execution by a processor. In these types of systems, a platform timer provides a convenient and consistent mechanism for the operating system to schedule the DPC for execution. In any event, similar to the "METRIC OF PAST PROCESSOR IDLENESS" 310 described above, an operating system may quantify the processing that is scheduled to be performed on a computer in the future. As described in further detail below, the variable in the "METRIC OF FUTURE PROCESSOR IDLENESS" 312 row may be used to identify a target state for a processor.

As further illustrated in FIG. 3, the row entitled "METRIC OF NON-PROCESSOR ACTIVITY" 314 is included in the data set 300 that is obtained by the target state routine 154 at block 202. Increasingly, modern computers provide mechanisms for devices to directly access hardware resources without direct processor involvement. For example, Direct Memory Access ("DMA") is a mechanism provided by most modern computing platforms that allows data coming into or out of a computer to be sent directly to or from system memory. In this instance, a processor does not need to perform processing to complete the data transfer thereby improving the overall performance of a computer. However, those skilled in the art and others will recognize that even in instances when a processor is bypassed, some amount of processing may need to be performed. For example, when DMA is performed on a computer, the processor will typically be required to maintain coherency between system memory and other hardware resources such as a processor cache. In this instance, keeping a processor in an idle state may inhibit the DMA from being properly performed. The variable in the "METRIC OF NON-PROCESSOR ACTIVITY" 314 row quantifies this type of activity so that a target state may be calculated that does not inhibit this type of activity.

In the embodiment of the present invention illustrated in FIG. 3, the "PROCESSOR SPECIFIC DATA" category 304 contains a row entitled "LATENCY" 316 and a row entitled "POWER SAVINGS" 318. In this regard, the row entitled "LATENCY" 316 contains a variable from which the latency overhead associated with idle sleep states that a processor is capable of entering may be obtained. As mentioned previously, when a processor proceeds into or returns from being put into an idle sleep state, a certain amount of overhead processing is performed, as the hardware re-initializes from the low power sleep state. The overhead processing performed when a processor proceeds into or returns from being put to "sleep" is typically referred to as latency. As mentioned previously, a higher idle state is typically associated with a greater latency as well as greater power savings. In any event, the variable in the "LATENCY" 316 row may be used to access data that describes the latency overhead of putting a processor to "sleep" for the specific processor that is installed on a computer. Similarly, the "PROCESSOR SPECIFIC DATA" category 304 contains a row entitled "POWER SAVINGS" 318 that contains a variable from which data that describes the power savings associated with the various idle states that a processor is capable of entering may be obtained. As mentioned previously, each successively higher idle state provides greater levels of power savings. The variable in the "POWER SAVINGS" 316 row may be used to access data that describes these power savings so that a target state may be identified.

Those skilled in the art and others will recognize that the data set 300 depicted in FIG. 3 and obtained by the target state routine 154 at block 202 should be construed as exemplary and not limiting. In other embodiments, additional or fewer data types may be obtained so that a target state for a processor may be identified. Also, those skilled in the art and others will recognize the data depicted in FIG. 3 may be in alternative formats without departing from the claimed subject matter.

Returning now to FIG. 2, at block 204, the target state routine 154 calculates a target state for one or more processors included with a computer. In accordance with one embodiment of the present invention, the data obtained by the target state routine 154, at block 202, is used to identify a target state for a processor that minimizes power consumption. In this regard, the calculation performed at block 204 weighs a variety of factors to identify an optimized state for the processor. For example, some platforms may exhibit a higher latency overhead when compared to other platforms. In this instance, the calculation performed at block 204 is less likely to cause a processor to enter a higher idle state when compared to platforms that have a lower latency overhead. Similarly, if the power savings of entering a higher idle state is minimal, the calculation performed at block 204 is less likely to cause a processor to enter a higher state. Moreover, generally described, as both past and future idleness of a processor increases, the greater the likelihood that the calculation performed at block 204 will cause the processor to enter a higher idle states so that power savings may be maximized. Finally, if certain types of non-processor activity are occurring, such as DMA, the less likely the processor will be assigned a higher state.

It should be well understood that the calculation performed at block 204 does not require a processor to stay in a particular state in order to be promoted or demoted into the next state. Stated differently, the linear promotion and demotion scheme performed by existing systems that dictates a processor remain in an idle state for a specified period of time is not used by the present invention. Instead, the calculation performed at block 204 may identify a target state that is one or more states away from the current state. Identifying a target state without using a linear promotion/demotion scheme has several advantages. First, advances in hardware technology have continued to reduce the exit latency associated with waking a processor from "sleep." Thus, additional power savings over existing systems may be achieved by identifying the most appropriate state for a processor given the activity that has or will be performed on a computer. Second, those skilled in the art and others will recognize that processing performed by a processor tends to be "bursty." Stated differently, over time a processor tends to alternate between periods of either being highly utilized in executing program code or underutilized (e.g., idle). Thus, identifying a target state that does not require linear promotion/demotion better adheres to how processors perform in practice. For example, when a "burst" of processor activity occurs, aspects of the present invention may cause a processor to proceed from a high idle state into the working state without having to progress through any intermediate states. Again, by identifying an appropriate target state when bursts of processor activity or idleness occur, additional power savings are achieved as the processor is not required to proceed through a linear progression of states that are not appropriate given the activity that has or is scheduled to occur on a computer.

It should also be well understood that some factors described above that are used to calculate a target state at block 204 may, and typically will, be given greater significance than other factors. For example, one aspect of the present invention is the use of a metric that measures the future idleness of a processor in calculating a target state for a processor. In this regard and as described previously with reference to FIG. 3, aspects of the target state routine 154 obtain a metric (e.g., "METRIC OF FUTURE PROCESSOR IDLENESS" 312) at block 202 and use the metric as a factor in calculating the target state for a processor at block 204. Since this metric measures the amount of processing that will be performed in the future it is an especially good predictor in identifying an appropriate idle state that maximizes the amount of power saved without negatively impacting the user experience. As a result, the calculation performed at block 204 may give greater significance to this metric, or other factor(s) described above, to identify a target state. Moreover, the calculation performed at block 204 accounts for the configurable policies that may vary between computers. As described previously, aspects of the present invention allow third-parties (e.g., computer manufacturers, users, etc.) to configure the power management features of an operating system with policies that affect the calculation performed at block 204. For example, policies may be implemented that give greater significance to certain factors in identifying a target state than others. In still other instances, a policy may be implemented that overrides the calculation performed at block 204 and prevents a processor from proceeding into an optimized state.

The configurable aspects of the calculation performed at block 204 may be used to account for guarantees provided by an operating system. For example, some "real-time" operating systems in which the present invention may be implemented guarantee that services are satisfied within a specified period of time. In this regard, an operating system may guarantee that a certain amount of incoming network traffic is processed within a specified period of time. In this instance, the "METRIC OF NON-PROCESSOR ACTIVITY" 314 obtained at block 202 that accounts for DMA activity may be given greater significance than other factors described above or may be the only factor used to identify a target state at block 204. These examples illustrate that the way in which the calculation is performed at 204 is highly configurable depending on the needs of an operating system, user, computer manufacturers, etc.

As illustrated in FIG. 2, at decision block 206, the target state routine 154 determines whether the target state for the processor identified at block 204 is different than the current state of the processor. As mentioned previously, the current state of the processor is stored and available to the target state routine 154 using existing systems. At block 206, the routine 154 performs a comparison of the current state of the processor with the target state calculated at block 204 using techniques that are generally known in the art. If the current state of the processor is the same as the target state calculated at block 204, the target state routine 154 proceeds to block 212 where it terminates. Conversely, if the target state is different than the current state, the routine 154 proceeds to block 208.

At block 208, the target state routine 154 updates a data store (e.g., the data store 150) with data that is used by a software system to regulate power consumption of a processor. For example, as mentioned previously, data in the data store 150 may be retrieved to determine when a target state was most recently calculated. At block 208, the routine 154 updates data in the data store 150 that includes this type of information so that power consumption may be accurately regulated in the future.

At block 210, the target state routine 154 causes the state of the processor to be changed from its current state to the target state calculated at block 204. If block 210 is reached the current state of the processor is different than the target state calculated at block 204. In this instance, the target state routine 154 causes the processor to transition into the target state. As described previously, one aspect of the present invention is a processor driver (e.g., the processor driver 122) that abstracts the differences between various processors available in the marketplace and is used to execute transitions in processor states. Thus, in accordance with one embodiment of the present invention, the target state routine 154 causes a state transition to occur, at block 210, by issuing a call to a processor driver. Then, the target state routine 154 proceeds to block 212 where it terminates.

While illustrative embodiments have been illustrated and described, it will be appreciated that various changes can be made therein without departing from the spirit and scope of the invention.

The embodiments of the invention in which an exclusive property or privilege is claimed are defined as follows:

1. In a computer that includes a processor and a software system for managing a power consumption of the processor, a computer-implemented method of identifying a target idle state for the processor, the method comprising:
   (a) collecting data from a plurality of data sources, wherein the plurality of data sources:
      (i) measures activities that have occurred or will occur on the computer; and
      (ii) describes attributes of the hardware on the computer;
   (b) using the collected data to calculate a target idle state that minimizes the power consumption, wherein:
      using the collected data comprises using a metric to identify the target idle state,
      using the metric to identify the target idle state includes assigning a significance to each of factors used to calculate the target idle state, and
      at least one first factor among the factors is assigned a greater significance than another factor; and
   (c) changing the idle state of the processor to the target idle state without requiring the processor to proceed linearly between idle states.

2. The method as recited in claim 1, further comprising updating a data store used by the software system that manages the power consumption of the processor with data that describes: (a) a current idle state of the processor; and (b) a most recent time when a calculation to identify the target idle state of the processor occurred.

3. The method as recited in claim 1, wherein the computer includes a plurality of processors and the method identifies a target idle state for the plurality of processors.

4. The method as recited in claim 1, wherein collecting the data from the plurality of data sources includes determining whether the processor is idle, and wherein determining whether the processor is idle includes identifying whether a thread managed by an operating system exists with program code that is ready to be executed.

5. The method as recited in claim 1, wherein the data collected from the plurality of data sources includes a metric of processing scheduled to occur in the fixture.

6. The method as recited in claim 1, wherein the data obtained from the plurality of data sources, includes: (a) a metric of the idleness of the processor; and (b) a metric that quantifies activities scheduled to be performed that do not require direct involvement by the processor.

7. The method as recited in claim 1, wherein the data collected from the plurality of data sources that describes attributes of the hardware on the computer includes:
  (a) a latency overhead of putting the processor to sleep when the processor is in a specific idle state; and
  (b) power savings achieved when the processor is in a specific idle state.

8. The method as recited in claim 1, wherein collecting the data from the plurality of data sources includes: (a) processing Advanced Configuration and Power Interface compliant information in the BIOS of the computer; and (b) causing the processed information to be stored in a data store that is accessible to the software system that manages the power consumption.

9. The method as recited in claim 1, wherein using the data collected to calculate the target idle state for the processor includes: (a) allowing a set of configurable policies to be defined; and (b) applying the configurable policies to identify the target idle state for the processor.

10. The method as recited in claim 1, wherein using the data collected to calculate the target idle state includes evaluating factors described in the data obtained from the plurality of data sources; and wherein a factor used to calculate the target idle state is assigned a greater significance than other factors.

11. The method as recited in claim 1, wherein changing the idle state of the processor includes issuing a call to a processor driver that is configured to execute a state transition from a current state to the target idle state.

12. A computer-implemented method for using a metric that quantifies the processing scheduled to be performed on a computer to identify a target idle state for a processor, the method comprising: (a) recording events that are scheduled to be performed on the computer in the future; (b) calculating a metric that quantifies the processing scheduled to the performed on the computer in the future; (c) using the metric to identify a target idle state for the processor; and (d) changing the idle state of the processor to the target idle state.

13. The method as recited in claim 12, wherein one event that is quantified in the metric is a deferred procedure call.

14. The method as recited in claim 12, wherein using the metric to identify a target idle state for a processor includes assigning a significance to each of the factors used to calculate target idle state; and wherein a first factor used to calculate the target idle state is assigned a greater significance than another factor.

15. The method as recited in claim 12, wherein the state of the processor may be changed to a target state that is more than one state away from the current state of the processor.

16. In a computer that includes a processor, a software system for managing a power consumption of the processor, the software system comprising:
  (a) a data store where data that is relevant in calculating a target idle state for the processor is collected from a plurality of data sources;
  (b) a target state routine operative to:
    (i) retrieve data from the data store; and
    (ii) calculate a target idle state that minimizes the power consumption of the processor using the retrieved data, wherein:
      using the retrieved data comprises using a metric to identify the target idle state,
      using the metric to identify the target idle state includes assigning a significance to each of factors used to calculate the target idle state, and
      at least one first factor among the factors is assigned a greater significance than another factor; and
  (c) a processor driver operative to cause the processor to transition from a current state to the target idle state calculated by the target state routine.

17. The software system as recited in claim 16, further comprising a calculation engine that uses a nonlinear scheme for transitioning between idle states identified by the target state routine.

18. The software system as recited in claim 16, wherein the target state routine is configured to use data that quantifies an amount of processing scheduled to be performed by the processor in the future to calculate the target state.

19. The software system as recited in claim 16, wherein the components that manage the power consumption of the processor execute in a privileged area of an operating system.

20. The software system as recited in claim 16 wherein the target state routine is further configured to enforce policies that vary between computers when identifying a target state for a processor.

* * * * *

UNITED STATES PATENT AND TRADEMARK OFFICE
CERTIFICATE OF CORRECTION

| | | |
|---|---|---|
| PATENT NO. | : 7,490,256 B2 | Page 1 of 1 |
| APPLICATION NO. | : 11/397782 | |
| DATED | : February 10, 2009 | |
| INVENTOR(S) | : Allen Marshall et al. | |

It is certified that error appears in the above-identified patent and that said Letters Patent is hereby corrected as shown below:

In column 11, line 5, in Claim 5, delete "fixture." and insert -- future. --, therefor.

Signed and Sealed this
Third Day of May, 2011

David J. Kappos
*Director of the United States Patent and Trademark Office*